(12) United States Patent
Li et al.

(10) Patent No.: US 12,341,691 B2
(45) Date of Patent: Jun. 24, 2025

(54) ROUTER

(71) Applicant: HONOR DEVICE CO., LTD., Shenzhen (CN)

(72) Inventors: Youzhang Li, Shenzhen (CN); Yangyang Xia, Shenzhen (CN); Cun Wang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 464 days.

(21) Appl. No.: 17/914,921

(22) PCT Filed: May 7, 2021

(86) PCT No.: PCT/CN2021/092123
§ 371 (c)(1),
(2) Date: Sep. 27, 2022

(87) PCT Pub. No.: WO2021/238607
PCT Pub. Date: Dec. 2, 2021

(65) Prior Publication Data
US 2023/0164069 A1 May 25, 2023

(30) Foreign Application Priority Data
May 25, 2020 (CN) .......................... 202010450780.5

(51) Int. Cl.
*H04L 45/60* (2022.01)
*H04Q 1/02* (2006.01)

(52) U.S. Cl.
CPC .............. *H04L 45/60* (2013.01); *H04Q 1/11* (2013.01)

(58) Field of Classification Search
CPC ........... H04L 45/60; H04L 49/40; H04Q 1/11; H04Q 1/116; H04Q 1/025; H04Q 1/02; H01Q 1/084; H01Q 1/2291
See application file for complete search history.

(56) References Cited

U.S. PATENT DOCUMENTS

| 10,635,141 B2 | 4/2020 | Silvanto et al. | |
| 2002/0163472 A1* | 11/2002 | Kasuya | H01Q 1/2275 343/702 |
| 2005/0128163 A1* | 6/2005 | Liu | H01Q 1/084 343/790 |
| 2009/0066605 A1* | 3/2009 | Kakinoki | H01Q 1/2275 343/882 |

(Continued)

FOREIGN PATENT DOCUMENTS

| CN | 204316525 U | 5/2015 |
| CN | 205488478 U | 8/2016 |

(Continued)

*Primary Examiner* — Wilson Lee
(74) *Attorney, Agent, or Firm* — WOMBLE BOND DICKINSON (US) LLP

(57) ABSTRACT

This application provides a router. A shielding portion is formed by extending outward an end of a housing where a rotary shaft seat is disposed. The rotary shaft seat is disposed on a side of the shielding portion facing a back of the housing. An end of the shielding portion away from the housing extends to at least a side of the rotary shaft seat away from the housing, so as to shield a front of the rotary shaft seat. In this way, the rotary shaft seat is invisible in a conventional viewing angle, that is, a viewing angle from a front of the router.

13 Claims, 13 Drawing Sheets

(56) References Cited

U.S. PATENT DOCUMENTS

| | | | | |
|---|---|---|---|---|
| 2010/0245185 A1* | 9/2010 | Mukai | ................... | H01R 31/06 |
| | | | | 343/702 |
| 2010/0309083 A1* | 12/2010 | Su | ........................... | H01Q 9/16 |
| | | | | 343/822 |
| 2018/0097287 A1* | 4/2018 | Matsuoka | ............ | H01Q 1/2266 |
| 2018/0210499 A1* | 7/2018 | Tsubaki | ................ | G06F 1/1616 |
| 2019/0006747 A1* | 1/2019 | Wang | ....................... | H01Q 9/16 |

FOREIGN PATENT DOCUMENTS

| | | | |
|---|---|---|---|
| CN | 205646096 U | 10/2016 | |
| CN | 205862269 U | 1/2017 | |
| CN | 109039926 A | 12/2018 | |
| CN | 110830379 A | 2/2020 | |
| CN | 210112038 U | 2/2020 | |
| CN | 210297747 U | 4/2020 | |
| CN | 111163020 A | 5/2020 | |
| KR | 101446214 B1 | 10/2014 | |
| WO | 2017006501 A1 | 1/2017 | |

* cited by examiner

ROUTER

CROSS-REFERENCE TO RELATED APPLICATIONS

This application is a national stage of International Application No. PCT/CN2021/092123, filed on May 7, 2021, which claims priority to Chinese Patent Application No. 202010450780.5, filed on May 25, 2020. The disclosures of each of the aforementioned applications are incorporated by reference herein in their entireties.

TECHNICAL FIELD

This application relates to the technical field of terminal devices, and in particular, to a router.

BACKGROUND

A router is a hardware device connecting two or more networks, which is used as a gateway between the networks. The router is a specialized intelligent network device reading an address in each data packet and then deciding how to transmit the address.

In the conventional technology, the router includes a housing and an antenna connected to one end of the housing. A rotary shaft seat is disposed on one end of the housing. A shaft pin is inserted through the rotary shaft seat. One end of the antenna is sleeved on the shaft pin to realize hinged connection to the housing. A cable in the housing connected to a circuit board is electrically connected to an interior of the antenna through a threading hole on the rotary shaft seat, so as to realize normal transmission of an electrical signal between the circuit board and the antenna.

SUMMARY

This application provides a router. A rotary shaft seat of the router is invisible when viewed from a front of the router.

In one aspect, this application provides a router, including a housing, at least one rotary shaft seat, and at least one antenna. The rotary shaft seat is disposed on one end of the housing. A shaft pin is inserted through the rotary shaft seat. One end of the antenna is movably sleeved on the shaft pin, and an other end of the antenna is located on a side of a front of the housing. A shielding portion extends from an end of the housing where the rotary shaft seat is disposed. The shielding portion and the housing are integrally formed as a whole. The rotary shaft seat faces a side of a back of the housing. An end of the shielding portion away from the housing extends to at least a side of the rotary shaft seat away from the housing.

In this application, the shielding portion extends outward from the end of the housing where the rotary shaft seat is disposed, the rotary shaft seat is disposed on a side of the shielding portion facing the back of the housing, and the end of the shielding portion away from the housing extends to at least the side of the rotary shaft seat away from the housing. Therefore, a front of the rotary shaft seat is shielded by the shielding portion. In addition, the rotary shaft seat is disposed on an inner side of the shielding portion. In this way, external debris such as dust is prevented from entering a threading hole in the rotary shaft seat from the front of the router, thereby preventing contamination or damage to a cable in the rotary shaft seat.

Optionally, the router further includes two ribs disposed opposite to each other. The two ribs respectively extend from two ends of the shielding portion toward a side where the rotary shaft seat is disposed. The ribs shield at least the shaft pin on two sides of the rotary shaft seat.

In this application, the ribs are disposed at the two ends of the shielding portion and shield at least the shaft pin on the two sides of the housing. In this way, a user cannot see the shaft pin from the side of the router, thereby further improving an aesthetic degree of an appearance of the router.

Optionally, a plurality of antennas are disposed. The plurality of antennas are spaced apart from each other in a first extending direction of the housing. Each of the antennas is connected to the housing by using the corresponding rotary shaft seat. In this way, it can be ensured that each antenna can be stably rotated around the rotary shaft seat and can be stably switched between a stored state and a used state.

Optionally, the antenna includes an antenna body and two hangers bent from one end of the antenna body to a direction of the rotary shaft seat. The two hangers are respectively sleeved on the shaft pin on the two ends of the rotary shaft seat. An avoidance opening is formed between each of the hangers and the antenna body. The avoidance opening is configured for the antenna body to avoid the shielding portion in a case that the antenna body rotates toward a surface of the housing. Therefore, the antenna is not affected by the shielding portion when during rotation around the rotary shaft seat. In this way, it can be ensured that the antenna body of the antenna can be stably rotated to the outer surface of the housing, thereby achieving effective storing of the antenna.

Optionally, the antenna further includes a transition portion connected between the hangers and the antenna body. The hangers and the antenna body are located on a same side of the transition portion. The hangers, the transition portion, and an inner wall of the antenna body form the avoidance opening. A distance between the hangers and the antenna body is greater than or equal to a thickness of the shielding portion.

In this application, the transition portion is disposed between the hangers and the antenna body, and the hangers and the antenna body are disposed on the same side of the transition portion. That is to say, the hangers are disposed at a hook end of the antenna. In this way, during rotation of an end of the antenna away from the rotary shaft seat toward the housing, the shielding portion gradually extends into the avoidance opening between the hangers and the antenna body, until the antenna body of the antenna is rotated to an upper surface of the housing. By means of the above arrangement, the antenna is not be affected by the shielding portion in an entire storing process, and the hangers can be stably sleeved on the shaft pin on the two ends of the rotary shaft seat during the rotation of the antenna, thereby ensuring stable connection between the antenna and the housing. In addition, the hangers and the antenna body are disposed on the same side of the transition portion. Therefore, a size of a connecting end of the antenna in a width direction is further reduced, thereby reducing a size of the router. Moreover, when distances between the hangers and the antenna body are equal to the thickness of the shielding portion, the avoidance opening between the hangers and the antenna body can cause the shielding portion to be effectively avoided, and the size of the antenna in the width direction is reduced. Therefore, a width of the router in the used state is reduced. In addition, an excessively large height of the router caused by an excessively large distance between the antenna and the upper surface of the housing when the antenna is stored above the housing is avoided. In this way, the router can be stored more effectively.

Optionally, the antenna further includes a first reinforcing member. Two ends of the first reinforcing member are respectively connected to inner surfaces of the two hangers. A first threading hole is formed on the rotary shaft seat, and a second threading hole is formed on the first reinforcing member. The second threading hole is in communication with the first threading hole and an antenna cavity of the antenna body. The antenna further includes a second reinforcing member. Two ends of the second reinforcing member are respectively connected to sides of the two hangers close to the antenna body. An end of the first reinforcing member close to the antenna body is connected to the second reinforcing member.

In this application, the first reinforcing member and the second reinforcing member are disposed between the inner surfaces of the two hangers to enhance structural strength of the two hangers. For example, when the hangers are disposed on the hook end of the antenna, the two hangers are independent of each other. Since the first reinforcing member is disposed, stability of the mechanical structures of the two hangers is improved, and it is ensured that the two hangers can be stably sleeved on the shaft pin on the two sides of the rotary shaft seat. In this way, stable connection is achieved between the antenna and the shaft pin. In addition, the second threading hole is formed in the first reinforcing member. In this way, the cable extending through the first threading hole in the rotary shaft seat can enter the antenna cavity of the antenna body through the second threading hole, thereby achieving effective feeding for the antenna body. Moreover, an end of the first reinforcing member close to the antenna body is connected to the second reinforcing member. In this way, structural strength of the first reinforcing member and the second reinforcing member is increased, thereby further improving the structural stability of the hangers on the two sides of the first reinforcing member and the second reinforcing member.

Optionally, the router further includes an antenna bottom cover. A connecting wall extends from a bottom of each of the two hangers away from the hangers. A blocking wall extends downward from a side wall of the antenna body facing away from the hangers. The two connecting walls, the first reinforcing member, and the blocking wall form a wiring groove. The second threading hole is brought into communication with the antenna cavity of the antenna body through the wiring groove. The antenna bottom cover is disposed at an opening of the wiring groove.

In this application, the antenna bottom cover is disposed on the wiring groove at the bottom of the antenna to seal a bottom opening of the wiring groove. In this way, the cable in the wiring groove is shielded, so that the aesthetic degree of the appearance of the router is improved. In addition, dust or oil on a desktop is prevented from entering the wiring groove and causing contamination or even damage to the cable.

Optionally, a first sliding groove is formed on an inner wall of each of the two connecting walls. The first sliding groove extends from an end of the connecting wall away from the blocking wall toward the blocking wall. A first sliding rail matching the first sliding groove is formed on a side wall of the antenna bottom cover. The first sliding rail is stored in the first sliding groove. In this way, the antenna bottom cover can be conveniently inserted between the two connecting walls, thereby improving assembly efficiency of the antenna bottom cover. In addition, since the first sliding rail is snapped in the first sliding groove, the antenna bottom cover is prevented from moving in an extending direction at a specific angle to the first sliding rail, thereby improving assembly stability of the antenna bottom cover in the wiring groove.

Optionally, a slot is further formed on the inner wall of each connecting wall, and a snap matching the slot is disposed on the side wall of the antenna bottom cover. The snap is snapped in the slot. A protrusion is disposed on an end of the first sliding groove close to the blocking wall. The slot is a recess formed between the protrusion and the blocking wall. The snap is disposed in an extending direction of the first sliding rail. A gap configured for the protrusion to be snapped in is formed between the snap and the first sliding rail. A width of the gap along the extending direction of the first sliding rail is equal to a width of the protrusion.

In this application, the snap is disposed in the extending direction of the first sliding rail, and the slot is disposed in an extending direction of the first sliding groove. In this way, when the snap is snapped into the recess between the protrusion and the blocking wall, the antenna bottom cover is prevented from moving in the extending direction of the first sliding rail. In addition, the width of the gap along the extending direction of the first sliding rail is caused to be equal to the width of the protrusion. In this way, the antenna bottom cover is further prevented from moving in the extending direction of the first sliding groove.

Optionally, at least part of a surface of an end of the snap away from the first sliding rail is configured as an inclined surface, and the inclined surface faces the end away from the first sliding rail. Therefore, the snap can conveniently span the protrusion on one end of the first sliding groove to be snapped into the recess between the protrusion and the blocking wall, thereby improving the efficiency of assembling the antenna bottom cover and the antenna.

Optionally, a second sliding groove is further formed on the inner wall of each of the two connecting walls. The second sliding groove extends from the end of the connecting wall away from the blocking wall to the blocking wall. The second sliding groove is spaced apart from the first sliding groove. A second sliding rail matching the second sliding groove is formed on the side wall of the antenna bottom cover. The second sliding rail is embedded in the second sliding groove. The second sliding rail is configured as an outer edge portion extending outward from a bottom of the antenna bottom cover.

In this application, the second sliding rail and the second sliding groove are respectively disposed on the side wall of the antenna bottom cover and the inner wall of the connecting wall, so as to further improve the efficiency of assembling the antenna bottom cover and the antenna and ensure stability of the antenna bottom cover in an extending direction perpendicular to the second sliding rail. In addition, the second sliding rail is used as the outer edge portion of the antenna bottom cover. Therefore, a groove wall of the second sliding groove close to a bottom end of the connecting wall can effectively block the outer edge portion, thereby protecting the outer edge portion.

Optionally, a first limiting portion and a second limiting portion are disposed on a side of the rotary shaft seat facing the hangers. The first limiting portion is configured to prevent the antenna at a used position from rotating around the shaft pin, so that the antenna does not shake in the used state, thereby ensuring that a signal transmitted by the antenna is more stable. In addition, the first limiting portion that is disposed can further fix the antenna during the rotation of the antenna. That is to say, as long as the hangers of the antenna are rotated to the first limiting portions, the antenna can be ensured to be at the used position. The second limiting portion is configured to prevent the antenna at a stored position from rotating around the shaft pin, so that the antenna can be stably stored on the upper surface of the housing without shaking. The first limiting portion includes a first groove formed on the rotary shaft seat, and the second limiting portion includes a second groove formed on the rotary shaft seat. The first groove and the second groove both extend in a radial direction of the rotary shaft seat. A preset included angle exists between the first groove and the second groove. A protruding portion is formed on a side of each of the two hangers facing the rotary shaft seat. The protruding portion extends into the first groove when the antenna is at the used position, and the protruding portion extends into the second groove when the antenna is at the stored position. The first limiting portion and the second limiting portion are configured as groove structures, and the protruding portions matching the grooves are respectively disposed on the inner walls of the hangers. In this way, the antenna in the used state or the stored state is stabilized, and the structures of the first limiting portion and the second limiting portion are simplified, thereby improving manufacturing and assembly efficiency of the router in this application. In addition, two ends of each of the first groove and the second groove respectively extend to an outer edge of the rotary shaft seat, and two ends of the protruding portion extend to an outer edge of the hanger. In this way, contact areas between the protruding portions of the hangers and the grooves on the rotary shaft seat are increased, so that the hangers can be stabilized in an entire radial direction, thereby improving the stability of the antenna in the used state and the stored state.

Optionally, the housing includes a lower cover and an upper cover disposed on the lower cover. The upper cover and the lower cover form an accommodating cavity of the housing. The shielding portion is disposed on the upper cover.

DESCRIPTIONS OF REFERENCE NUMERALS

100—Router;
10—Housing; 20—Antenna; 30—Rotary shaft seat; 40—Shaft pin; 50—Shielding portion; 60—Rib; 70—Antenna bottom cover;
11—Upper cover; 12—Lower cover; 21—Antenna body; 22—Hanger; 23—Transition portion; 24—Avoidance opening; 25—First reinforcing member; 26—Second reinforcing member; 27—Connecting wall; 28—Blocking wall; 29—Wiring groove; 31—First threading hole; 32—First limiting portion; 33—Second limiting portion; 71—First sliding rail; 72—Snap; 73—Second sliding rail;
111—Extended plate; 211—Antenna cavity; 221—Mounting hole; 222—Protruding portion; 251—Second threading hole; 271—First sliding groove; 272—Protrusion; 273—Second sliding groove; 274—Protruding strip; 275—Slot.

DESCRIPTION OF EMBODIMENTS

Terms used in implementations of this application are merely intended to explain specific embodiments of this application rather than limit this application.

Generally, a router includes a housing and an antenna connected to one end of the housing. The antenna is hinged to one end of the housing for storing. Specifically, a rotary shaft seat is fixed on one end of the housing. A shaft pin is disposed on the rotary shaft seat. One end of the antenna is movably sleeved on the rotary shaft seat. In this way, the antenna can be rotated around the shaft pin. When the router is working, one end of the antenna away from the shaft pin may be rotated away from the housing. For example, the antenna is rotated to a position at a right angle to an upper surface of the housing. When the router is in a non-working state, the end of the antenna away from the shaft pin may be rotated to the housing to store the antenna.

During designing of a conventional router, the rotary shaft seat is exposed outside the housing and the antenna, and a user can see the rotary shaft seat from a conventional viewing angle (from a front of the router). As a result, the appearance of the entire router is affected, thus degrading user experience.

To resolve the above problem, in the embodiments of this application, a shielding portion extends outward from the end of the housing where the rotary shaft seat is disposed, and the rotary shaft seat is disposed on an inner side of the shielding portion. Therefore, a front of the rotary shaft seat is shielded by the shielding portion. In this way, the rotary shaft seat is invisible in the conventional viewing angle, that is, a viewing angle from the front of the router, thereby improving an aesthetic degree of an appearance of the entire router.

A structure of the router in the embodiments of this application is described in detail below.

Figure 1:
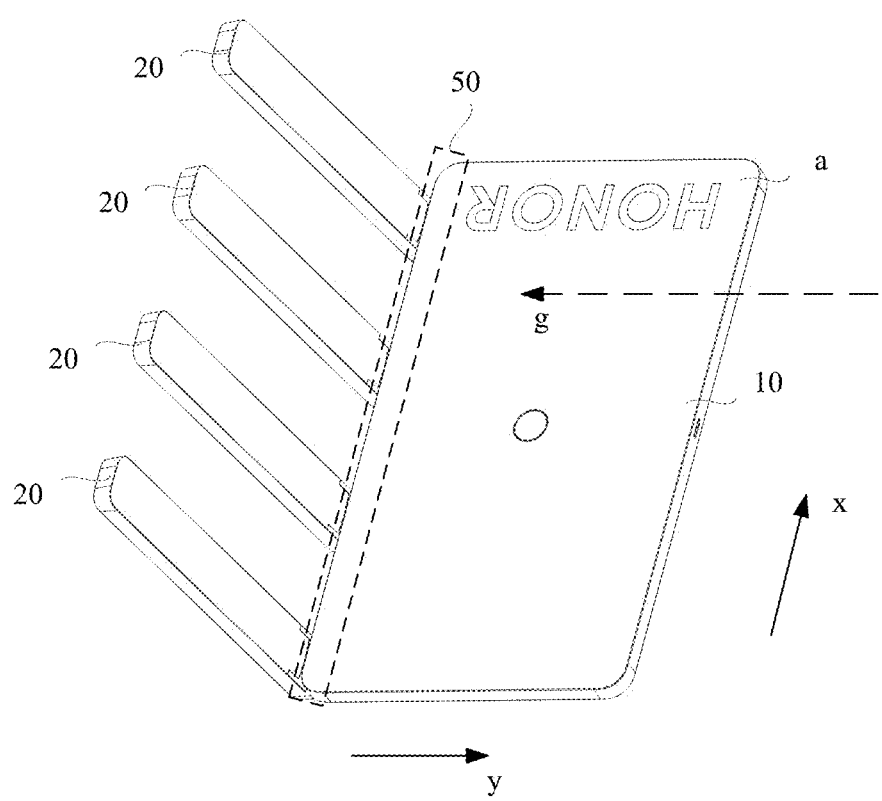
FIG. 1 is a schematic front view of a router in a working state according to an embodiment of this application.
Figure 2:
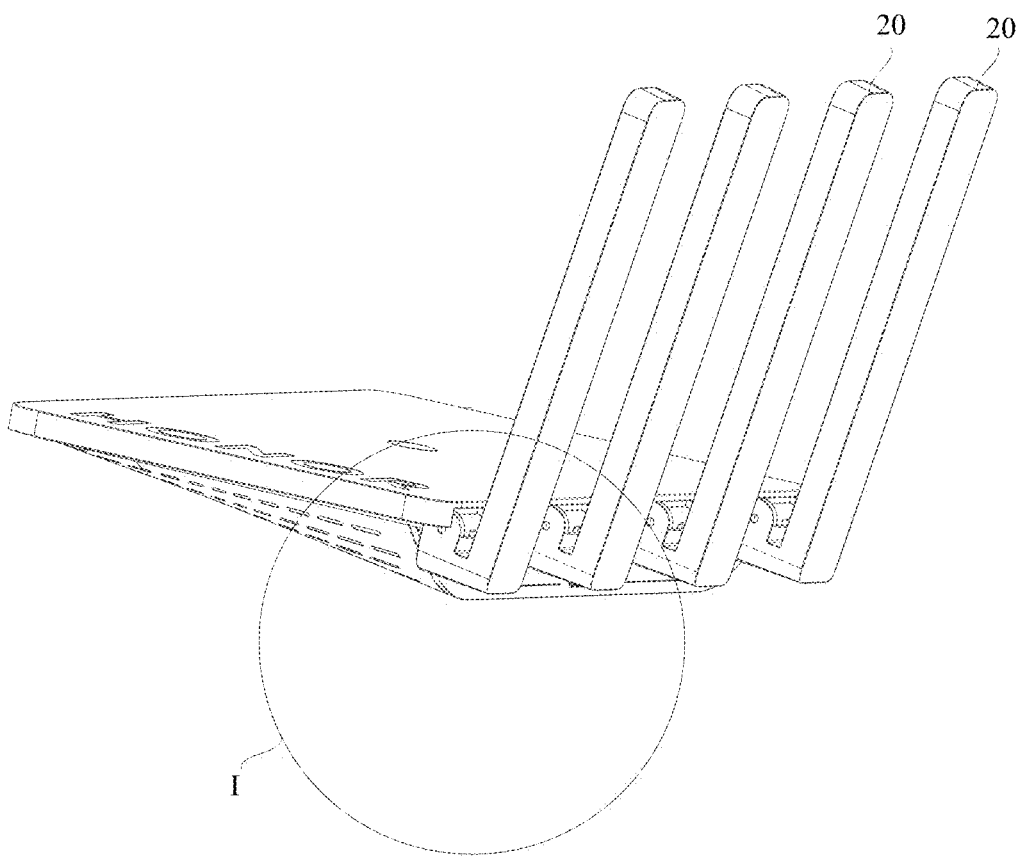
FIG. 2 is a schematic side view of the router in the working state according to an embodiment of this application.
Figure 3:
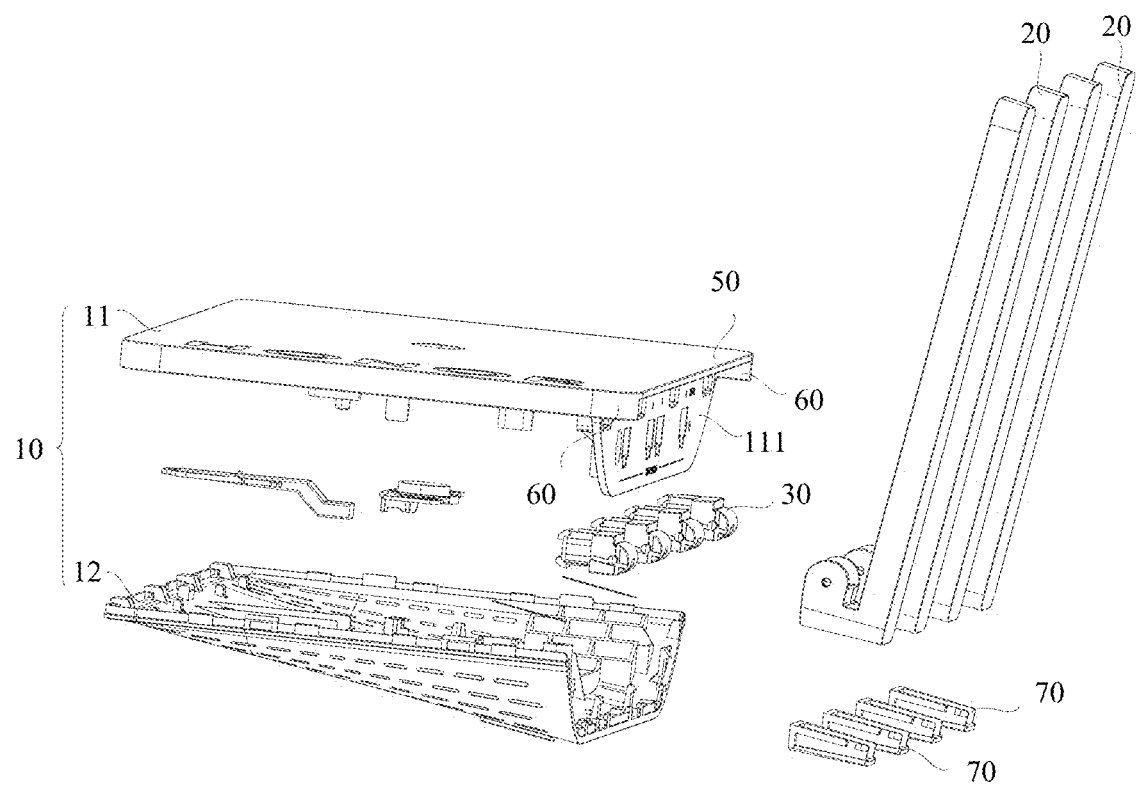
FIG. 3 is an exploded view of FIG. 2.
Figure 4:
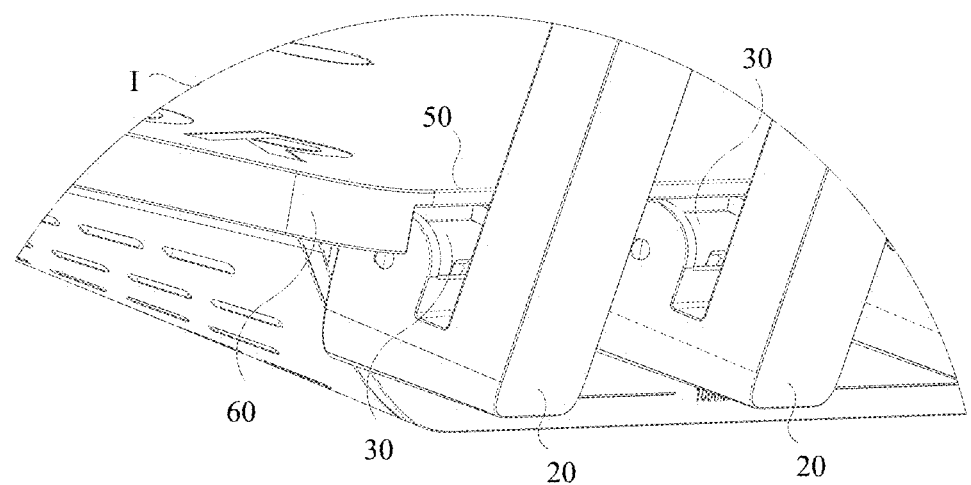
FIG. 4 is a partially enlarged view of I in FIG. 2.

FIG. 1 is a schematic front view of a router in a working state according to an embodiment of this application. FIG. 2 is a schematic side view of the router in the working state according to an embodiment of this application. FIG. 3 is an exploded view of FIG. 2. FIG. 4 is a partially enlarged view of I in FIG. 2.

Referring to FIG. 1, an embodiment of this application provides a router 100. The router may include a housing 10, at least one rotary shaft seat 30 (referring to FIG. 3), and at least one antenna 20.

Referring to FIG. 1, a front of the router 100 is specifically a surface of the router 100 seen in a g direction. In other words, the front of the router 100 is a side of the router 100 facing away from a platform such as a desktop when the router 100 is placed on the platform in a used state.

Referring to FIG. 1 and FIG. 2, a cross-sectional shape of the housing 10 may be any shape such as a rectangle, a square, or a circle. In this embodiment of this application, that the cross-sectional shape of the housing 10 is specifically a rectangle is used as an example for description. A length direction of the housing 10 may be a direction indicated by an arrow x in FIG. 1, and a width direction of the housing 10 may be a direction indicated by an arrow y in FIG. 1.

Referring to FIG. 3, the housing 10 may include a lower cover 12 and an upper cover 11 disposed on the lower cover 12. The lower cover 12 and the upper cover 11 form an accommodating cavity of the housing 10. Electronic elements of the router 100 such as a circuit board are disposed in the accommodating cavity.

Referring to FIG. 4, the rotary shaft seat 30 in this embodiment of this application is disposed on one end of the housing 10. For example, the rotary shaft seat 30 is connected to a long side of the housing 10.

The rotary shaft seat 30 may be detachably fixed to the housing 10 by means of snapped connection or threaded connection. For example, an extended plate 111 may be disposed on one end of the upper cover 11 of the housing 10 toward the lower cover 12. The rotary shaft seat 30 is detachably fixed to the extended plate 111 by means of the snap connection or the threaded connection, so as to facilitate independent replacement of the rotary shaft seat 30. Certainly, in some examples, the rotary shaft seat 30 may be integrally formed on one end of the housing 10, so as to simplify an assembly process of the router 100.

Figure 5:
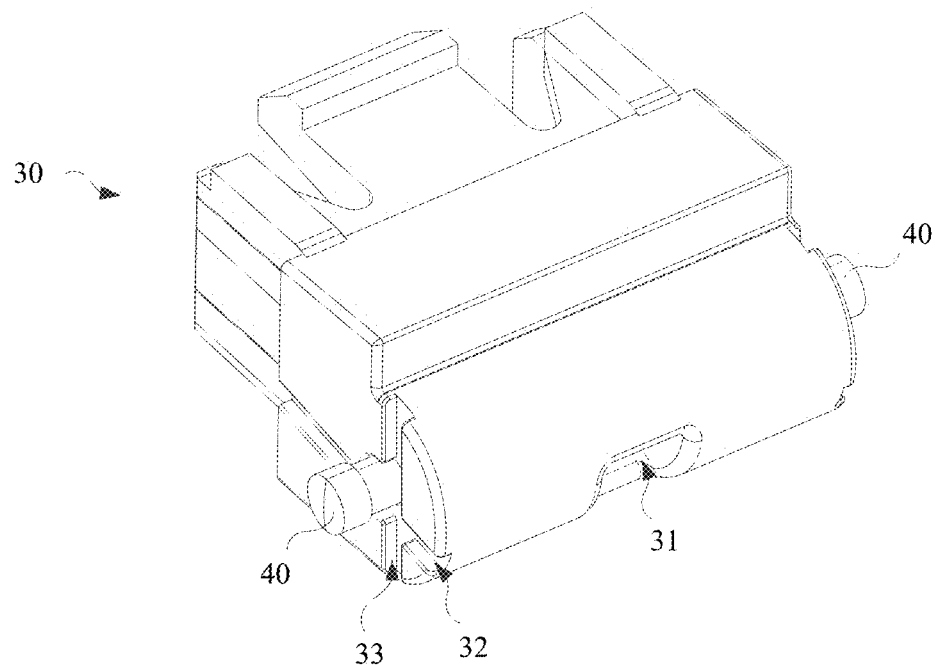
FIG. 5 is a schematic structural diagram of a rotary shaft seat in FIG. 2.
Figure 6:
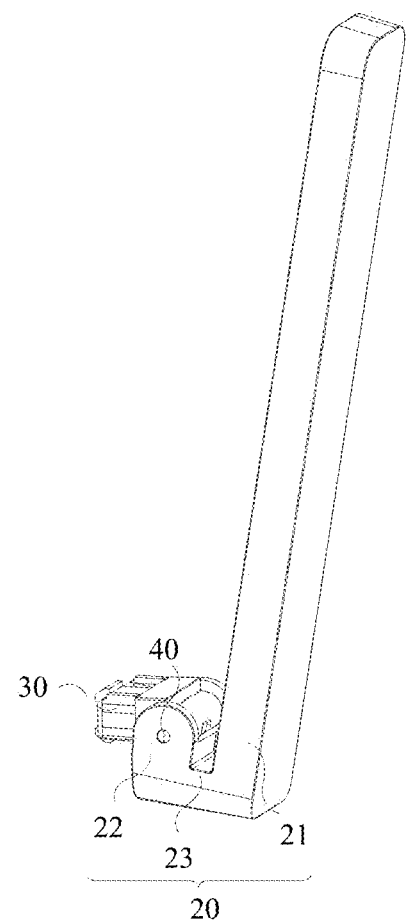
FIG. 6 is an assembled diagram of the rotary shaft seat in FIG. 2 and an antenna.

FIG. 5 is a schematic structural diagram of the rotary shaft seat in FIG. 2. FIG. 6 is an assembled diagram of the rotary shaft seat in FIG. 2 and an antenna. Referring to FIG. 5, a shaft pin 40 may be inserted through the rotary shaft seat 30 in this embodiment of this application, and both ends of the shaft pin 40 respectively extend out of two ends of the rotary shaft seat 30. As shown in FIG. 6, one end of the antenna 20 is movably sleeved on the shaft pin 40, and an other end of the antenna 20 is located on a side of the front of the housing 10. In this way, the antenna 20 can be rotated around the shaft pin 40. It may be understood that the shaft pin 40 and the rotary shaft seat 30 are fixed. For example, the shaft pin 40 does not rotate around an axis of the shaft pin in the rotary shaft seat 30. For example, the shaft pin 40 may be fixed in the rotary shaft seat 30 by using a key slot.

The other end of the antenna 20 is an end of the antenna 20 away from the rotary shaft seat 30.

Figure 7:
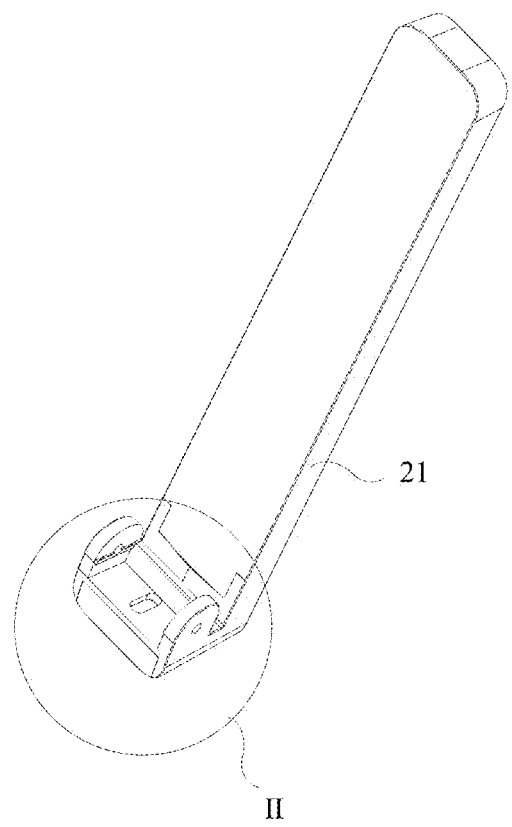
FIG. 7 is a schematic structural diagram of the antenna in FIG. 6.
Figure 8:
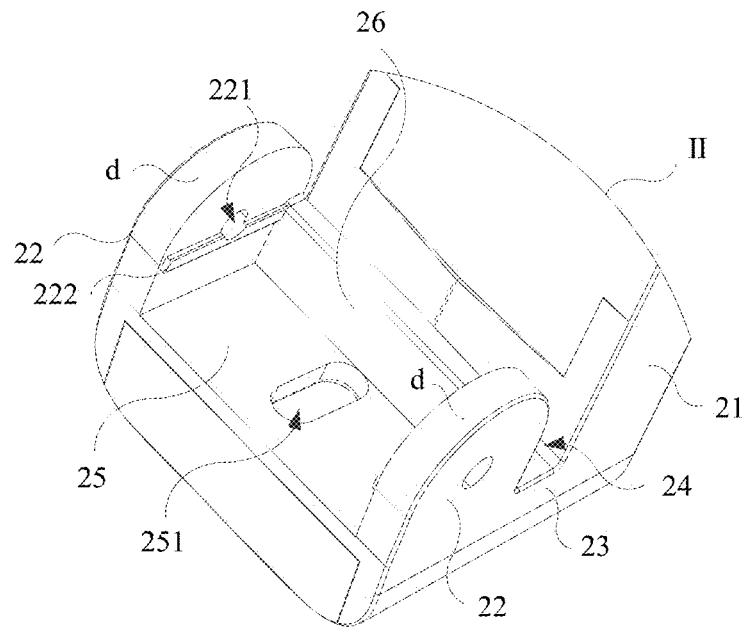
FIG. 8 is a partially enlarged view of II in FIG. 7.

FIG. 7 is a schematic structural diagram of the antenna in FIG. 6. FIG. 8 is a partially enlarged view of II in FIG. 7. Referring to FIG. 6, the antenna 20 in this embodiment of this application may include an antenna body 21 and two hangers 22 bent from one end of the antenna body 21 toward the rotary shaft seat 30. The two hangers 22 are disposed opposite to each other. As shown in FIG. 7 and FIG. 8, mounting holes 221 are respectively formed on the two hangers 22. The shaft pin 40 on two sides of the rotary shaft seat 30 are respectively inserted through the corresponding mounting holes 221, so that the two hangers 22 are inserted through the shaft pin 40.

Figure 9:
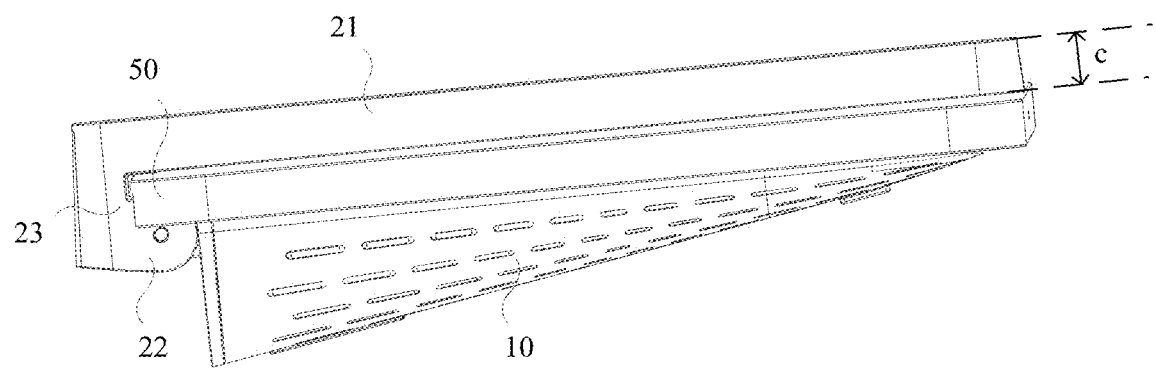
FIG. 9 is a schematic structural diagram of the router in a stored state according to an embodiment of this application.

FIG. 9 is a schematic structural diagram of the router in a stored state according to an embodiment of this application. Referring to FIG. 9, when the antenna 20 is required to be stored, the antenna body 21 of the antenna 20 is rotated to cause the end of the antenna body 21 away from the hangers 22 to rotate toward the housing 10, until the antenna body 21 is stored at a position close to an upper surface a of the housing 10 (referring to FIG. 1). When the antenna 20 is in the stored state, the antenna body 21 of the antenna 20 can come into contact with the upper surface a of the housing 10 (shown in FIG. 9), or may be at a specific distance from the upper surface a of the housing 10.

When the antenna 20 is required to be used, the antenna body 21 of the antenna 20 may be rotated away from the housing 10 (referring to FIG. 1 and FIG. 2). A specific included angle may exist between the antenna 20 and the upper surface a of the housing 10. The included angle may be an acute angle, a right angle, or an obtuse angle.

During the rotation of the antenna 20 in this embodiment of this application, the hangers 22 of the antenna 20 rotate stably around the shaft pin 40, thereby achieving stable rotation of the antenna 20.

It should be noted that the upper surface a of the housing 10 is specifically a side of the housing 10 facing away from a platform such as a desktop when the router 100 is placed on the platform. The front of the housing 10 is the upper surface a of the housing 10, that is, the surface of the housing 10 seen in the g direction in FIG. 1. A side of the housing 10 facing away from the upper surface a is a back of the housing 100.

In this embodiment of this application, the shaft pin 40 includes one shaft pin. In some other examples, the shaft pin 40 may include two shaft pins. The two shaft pins 40 are respectively inserted through the two ends of the rotary shaft seat 30, and the two hangers 22 of the antenna 20 are respectively sleeved on the shaft pins 40 on the two sides of the rotary shaft seat 30.

In order to prevent the hangers 22 from disengaging from movable ends of the shaft pin 40 (ends away from the rotary shaft seat 30), stopping portions (not shown) may be disposed on outer ends of the shaft pin 40. Sizes of outer contours of the stopping portions are greater than radial dimensions of the mounting holes 221 on the hangers 22. In this way, the hangers 22 are limited between the stopping portions and one end of the rotary shaft seat 30.

Referring to FIG. 9, a shielding portion 50 extends from the end (referring to FIG. 3 and FIG. 4) of the housing 10 in this embodiment of this application where the rotary shaft seat 30 is disposed. The shielding portion 50 and the housing 10 are integrally formed as a whole. For example, the shielding portion 50 is disposed on a long side of the housing 10 toward the antenna 20, and the rotary shaft seat 30 is located on a side of the shielding portion 50 facing the back of the housing 10 (referring to FIG. 4).

In this embodiment of this application, the shielding portion 50 extends outward from the end of the housing 10 where the rotary shaft seat 30 is disposed, and the rotary shaft seat 30 is disposed on the side of the shielding portion 50 facing the back of the housing 10. Therefore, the front of the rotary shaft seat 30 is shielded by the shielding portion 50. In this way, the rotary shaft seat 30 is invisible in the conventional viewing angle (the viewing angle in the direction of g in FIG. 1), thereby improving the aesthetic degree of the appearance of the entire router 100.

The shielding portion 50 may alternatively be integrated with the upper cover 11 of the housing 10 as a whole. In this way, not only strength of the connection between the shielding portion 50 and the housing 10 is enhanced, but also the assembly efficiency of the router 100 is improved. In addition, the shielding portion 50 and the housing 10 that are integrally formed causes the front of the router 100 to be more even and aesthetic.

Figure 12:
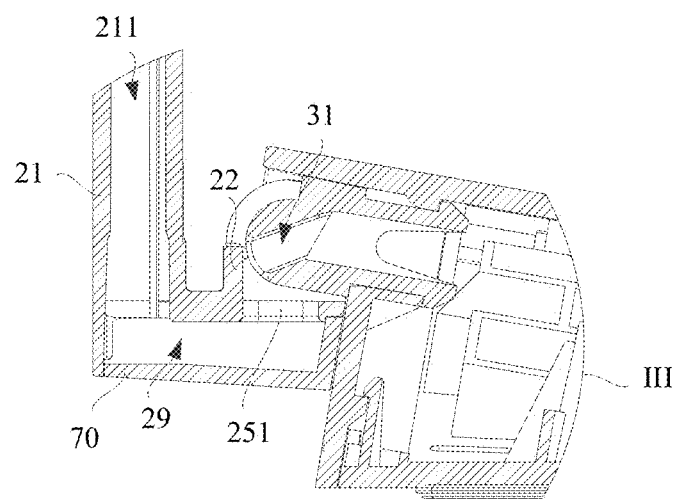
FIG. 12 is a partially enlarged view of FIG. 11.

Referring to FIG. 12, during actual application, a first threading hole 31 is further formed in the rotary shaft seat 30. A cable (not shown in the figure) drawn from the circuit board inside the housing 10 may enter an antenna cavity 211 of the antenna 20 through the first threading hole 31. For example, the antenna body 21 of the antenna 20 is a hollow structure. The cable may be drawn out from the first threading hole 31 and enter the antenna cavity 211 of the antenna body 21 to feed the antenna body 21 of the antenna 20. In this way, a signal in the router 100 is transmitted through the antenna body 21 of the antenna 20 in a form of an electromagnetic wave.

In this embodiment of this application, the rotary shaft seat 30 is disposed on an inner side of the shielding portion 50, so that external debris such as dust is prevented from entering the first threading hole 31 in the rotary shaft seat 30 from the front of the router 100. In this way, contamination or damage to the cable in the rotary shaft seat 30 is prevented, and the first threading hole 31 is also prevented from being blocked by dust or the like.

During specific configuration, a width by which the shielding portion 50 in this embodiment of this application extends toward the antenna 20 may be 6 mm to 15 mm. The width of the shielding portion 50 is distance between an end of the shielding portion 50 close to the housing 10 and an end close to the antenna 20. In some examples, the width of the shielding portion 50 may be set to a suitable value, such as 6 mm, 8 mm, 10 mm, or 12 mm.

A gap exists between an end of the shielding portion 50 in this embodiment of this application away from the housing 10 and the antenna 20. For example, the end of the shielding portion 50 away from the housing 10 is spaced apart from the antenna body 21 of the antenna 20 to reserve an activity space for the antenna 20 to rotate. Therefore, when the antenna 20 is rotated toward the upper surface a of the housing 10, the shielding portion 50 is not knocked or squeezed. In this way, structural stability of the shielding portion 50 is ensured, thereby improving a service life of the router 100, and the shielding portion 50 can stably shield the rotary shaft seat 30.

In addition, a thickness of the shielding portion 50 in this embodiment of this application may be 1.5 mm to 3 mm. For example, the thickness of the shielding portion 50 may be set to a suitable value, such as 1.5 mm, 2 mm, 2.5 mm, or 3 mm. The thickness of the shielding portion 50 is distance between a side of the shielding portion 50 located on the upper surface a of the housing 10 and a side of the shielding portion 50 facing away from the upper surface a of the housing 10.

In this embodiment of this application, the antenna 20 may include one antenna. For example, one antenna 20 is disposed on the long side of the housing 10. In order to shield the rotary shaft seat 30 between the antenna 20 and the housing 10, a shielding portion 50 may be disposed at a position on the housing 10 close to the rotary shaft seat 30. The shielding cover is disposed above the rotary shaft seat 30. The above of the rotary shaft seat 30 is specifically a side of the rotary shaft seat 30 facing the front of the router 100. In other examples, two ends of the shielding portion 50 may extend to two ends of the housing 10 disposed along the first extending direction, so as to ensure effective shielding of the front of the rotary shaft seat 30.

The first extending direction is specifically an extending direction of the end of the housing 10 where the shielding portion 50 is disposed. For example, when the shielding portion 50 is disposed on the long side of the housing 10, the first extending direction is a length direction of the housing 10 (the direction x in FIG. 1).

Figure 10:
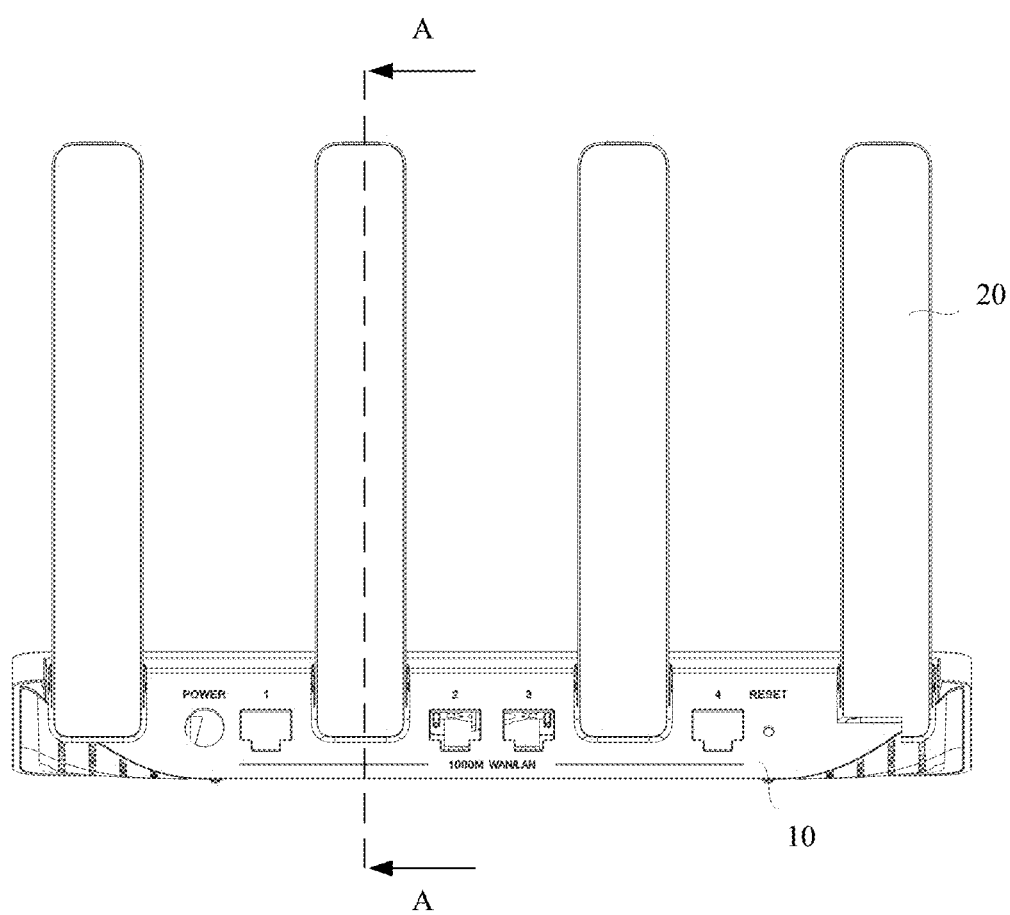
FIG. 10 is a rear view of FIG. 1.

In some examples, a plurality of antennas 20 may be disposed (referring to FIG. 10). The plurality of antennas 20 are spaced apart from each other in the first extending direction of the housing 10. For example, the plurality of antennas 20 are spaced apart from each other on the long side of the housing 10 along the direction x. Each antenna 20 is connected to the housing 10 by using the corresponding rotary shaft seat 30. In this way, it can be ensured that each antenna 20 can be rotated stably around the rotary shaft seat 30, so that each antenna 20 can be stably switched between the stored state and the used state.

Two ends of the shielding portion 50 in this embodiment of this application respectively extend to the two ends of the housing 10 along the first extending direction. For example, a shielding portion 50 is disposed on the long side of the housing 10, and two ends of the shielding portion 50 extend to two sides of the housing 10 along the length direction. In this way, not only it is ensured all rotary shaft seats 30 can be shielded by the shielding portion 50, but also a process of manufacturing the shielding portion 50 on the housing 10 is simplified, thereby improving manufacturing efficiency of the entire router 100. For example, the plurality of rotary shaft seats 30 can be shielded by assembling only one shielding portion 50 on one end of the housing 10 at one time.

The router 100 in this embodiment of this application further includes two ribs 60 (referring to FIG. 3 and FIG. 4) disposed opposite to each other. The two ribs 60 respectively extend from the two ends of the shielding portion 50 toward a side where the rotary shaft seat 30 is disposed. The ribs 60 shields at least one side of the shaft pin 40 on the two sides of the housing 10.

Specifically, the shaft pin 40 is disposed on each outermost rotary shaft seat 30 on one end of the housing 10. The ribs 60 in this embodiment of this application can shield one side of each outermost shaft pin 40, to hide the shaft pin 40 from the side of the router 100. In this way, when a user observes the router 100 from the side of the router 100, that is, from a short side of the housing 10, the shaft pins 40 on the two ends of the housing 10 is invisible, thereby further improving the aesthetic degree of the appearance of the router 100.

In some examples, the ribs 60 may extend to be flush with a bottom of the rotary shaft seat 30, or the ribs 60 may extend to be lower than the bottom of the rotary shaft seat 30, so that the two outermost rotary shaft seats 30 of the housing 10 are shielded by inner sides of the ribs 60. In this way, all of the rotary shaft seats 30 are located between the two ribs 60, and the user cannot observe all of the rotary shaft seats 30 from the side of the router 100.

The shielding portion 50 and the ribs 60 are all disposed, so that the front and the side of the rotary shaft seat 30 are shielded. In this way, not only user experience is improved, but also all of the rotary shaft seats 30 are protected.

In this embodiment of this application, the movable end of the antenna 20, that is, the end away from the rotary shaft seat 30 is easily interfered by the shielding portion 50 during rotation toward the housing 10. For example, the shielding portion 50 may hinder the rotation of the antenna 20. To avoid the above situation, an avoidance opening 24 (referring to FIG. 8) may be formed between the hangers 22 and the antenna body 21 of the antenna 20. The avoidance opening 24 is configured for the antenna body 21 of the antenna 20 to avoid the shielding portion 50 during rotation toward the surface of the housing 10.

For example, during rotation of the antenna body 21 of the antenna 20 toward the upper surface a of the housing 10, the shielding portion 50 may be moved into the avoidance opening 24 until the antenna body 21 reaches a stored position (shown in FIG. 9). Therefore, the antenna 20 is not affected by the shielding portion 50 during rotation around the rotary shaft seat 30. In this way, it can be ensured that the antenna body 21 of the antenna 20 can be stably rotated to the outer surface of the housing 10, thereby achieving effective storing of the antenna 20.

Specifically, the avoidance opening 24 is a space sandwiched between the hangers 22 and the antenna body 21. During specific configuration, included angles between the hangers 22 and the antenna body 21 may be set as acute angles (not shown in the figure), and extending directions of the hangers 22 may be enlarged. In this way, when the antenna body 21 of the antenna 20 is rotated toward the stored position, the shielding portion 50 can completely enter the space between the hangers 22 and the antenna body 21, and the stable connection between the hangers 22 and the shaft pin 40 is ensured.

In some examples, a transition portion 23 (referring to FIG. 8 and FIG. 9) may be further disposed between the hangers 22 and the antenna body 21. For example, two ends of the transition portion 23 are respectively connected to the antenna body 21 and the hangers 22. The hangers 22 and the antenna body 21 are located on a same side of the transition portion 23. The hangers 22, the transition portion 23, and an inner wall of the antenna body 21 form the avoidance opening 24.

The arrangement of the transition portion 23 causes the end of the antenna 20 close to the rotary shaft seat 30 form a hook end. That is to say, the end of the antenna 20 returns toward the end of the antenna 20 away from the rotary shaft seat 30. The hangers 22 are located on the hook end. In this way, during the rotation of the end of the antenna 20 away from the rotary shaft seat 30 toward the housing 10, the shielding portion 50 gradually extend into the avoidance opening 24 between the hangers 22 and the antenna body 21, until the antenna body 21 of the antenna 20 is rotated to the upper surface a of the housing 10.

By means of the above arrangement, the antenna 20 is not affected by the shielding portion 50 in an entire storing process, and the hangers 22 can be stably sleeved on the shaft pin 40 on the two ends of the rotary shaft seat 30 during the rotation of the antenna 20, thereby ensuring stable connection between the antenna 20 and the housing 10.

In addition, the hangers 22 and the antenna body 21 are disposed on the same side of the transition portion 23. Therefore, a size of a connecting end of the antenna 20 in a width direction is further reduced, thereby reducing a size of the router 100.

During specific configuration, the antenna body 21 and the hangers 22 may be perpendicular to the transition portion 23. That is to say, the hangers 22 and the antenna body 21 are parallel to each other. In this way, it is further ensured that the antenna 20 can avoid the shielding portion 50 during the rotation, and stability of the hangers 22 on the side of the rotary shaft seat 30 can be ensured.

The distances between the hangers 22 and the antenna body 21 may be equal to the thickness of the shielding portion 50. For example, when the thickness of the shielding portion 50 is 3 mm, the distances between the hangers 22 and the antenna 21 may be a suitable value such as 3 mm, 4 mm, or 5 mm. In this way, the avoidance opening 24 between the hangers 22 and the antenna body 21 can cause the shielding portion 50 to be effectively avoided. When the distances between the hangers 22 and the antenna 21 are equal to the thickness of the shielding portion 50, a size of the antenna 20 in the width direction is reduced, thereby reducing a width of the router 100 in the used state (an extended length of the router along the direction y in FIG. 1). In addition, an excessively large height of the router 100 caused by an excessively large distance between the antenna 20 and the upper surface a of the housing 10 when the antenna 20 is stored above the housing 10 is avoided. In this way, the router 100 can be stored more effectively.

It should be noted that the distances between the hangers 22 and the antenna body 21 are minimum distances between side surfaces of the hangers 22 facing the antenna body 21 and a side surface of the antenna body 21 facing the hangers 22. In addition, a width c of the antenna 20 (referring to FIG. 9) is a distance between the side of the antenna 20 facing the housing 10 and the side away from the housing 10.

The hangers 22 in this embodiment of this application each include an inner surface and an outer surface disposed opposite to each other and an outer edge surface d (referring to FIG. 8) located between the inner surface and the outer surface. The inner surfaces of the hangers 22 are surfaces of the two hangers 22 facing each other. In this embodiment of this application, at least part of the outer edge surfaces d of the hangers 22 toward the movable end of the antenna 20 may be configured as an arcuate surface.

When the movable end of the antenna 20 is rotated toward or away from the housing 10, the hangers 22 are rotated under the shielding portion 50. Since at least part of the outer edge surfaces of the hangers 22 is configured as an arcuate surface, it can be ensured that the hangers 22 can smoothly pass by a bottom surface of the shielding portion 50 without causing damage to the bottom surface of the shielding portion 50 during the rotation.

To enhance the structural stability of the two hangers 22, the antenna 20 in this embodiment of this application may further include a first reinforcing member 25 (referring to FIG. 8). Two ends of the first reinforcing member 25 are respectively connected to the inner surfaces of the two hangers 22. In other words, the two hangers 22 are connected by the first reinforcing member 25 to enhance the structural strength of the two hangers 22.

For example, when the hangers 22 are disposed on the hook end of the antenna 20, the two hangers 22 are independent of each other. Since the first reinforcing member 25 is disposed, the stability of the mechanical structures of the two hangers 22 is enhanced, and it is ensured that the two hangers 22 can be stably sleeved on the shaft pin 40 on the two sides of the rotary shaft seat 30. In this way, stable connection is achieved between the antenna 20 and the shaft pin 40.

Figure 11:
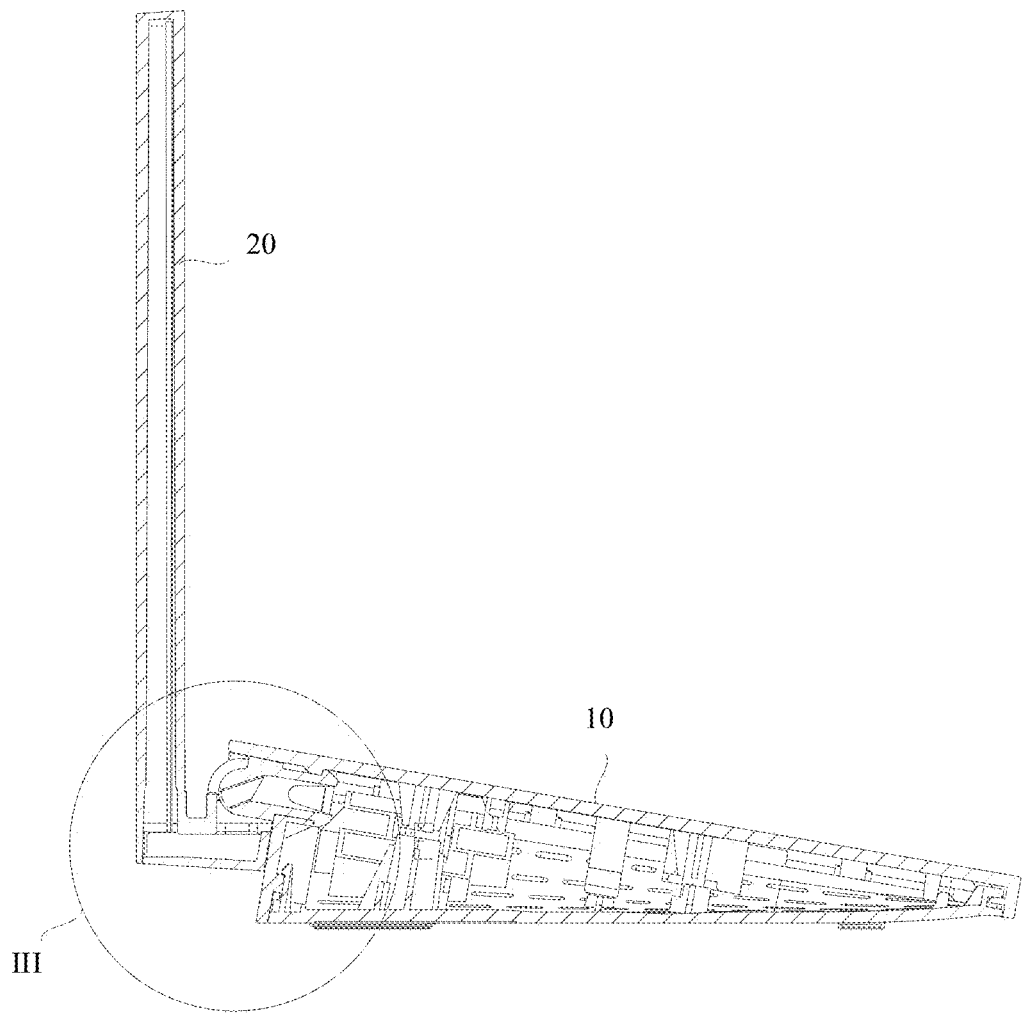
FIG. 11 is a cross-sectional view taken along line A-A in FIG. 10.

FIG. 10 is a rear view of FIG. 1. FIG. 11 is a cross-sectional view taken along line A-A FIG. 10. FIG. 12 is a partially enlarged view of FIG. 11. Referring to FIG. 12, a second threading hole 251 is formed in the first reinforcing member 25. The second threading hole 251 is in communication with the first threading hole 31 and the antenna cavity 211 of the antenna body 21. In this way, a cable extending through the first threading hole 31 in the rotary shaft seat 30 can enter the antenna cavity 211 of the antenna body 21 through the second threading hole 251, thereby achieving effective feeding for the antenna body 21.

The two ends of the first reinforcing member 25 may be fixed to the inner plate surfaces of the two hangers 22 by means of snap connection, so as to facilitate disassembly of the first reinforcing member 25. Certainly, the first reinforcing member 25 may alternatively be integrally formed with the two hangers 22. In this way, not only strength of the connection between the hangers 22 and the first reinforcing member 25 is increased, but also components of the antenna 20 are reduced, thereby improving the assembly efficiency of the antenna 20.

During specific configuration of the second threading hole 251, at least part of a hole wall of the second threading hole may be configured as an arcuate structure (referring to FIG. 8). In this way, the hole wall of the second threading hole 251 matches an outer surface of the cable more effectively, thereby preventing wear of the cable caused by long-term contact between the hole wall of the second threading hole 251 and the cable. In addition, a radial dimension of the second threading hole 251 may be equal to a radial dimension of the cable, so as to ensure that the cable does not shake in the second threading hole 251, thereby improving stability of a path of the cable.

To further enhance the structural stability of the two hangers 22, the antenna 20 in this embodiment of this application may further include a second reinforcing member 26 (referring to FIG. 8). Two ends of the second reinforcing member 26 are respectively connected to the sides of the two hangers 22 close to the antenna body 21.

During specific configuration, the first reinforcing member 25 and the second reinforcing member 26 may be reinforcing plates connected between the two hangers 22.

An end of the first reinforcing member 25 close to the antenna body 21 is connected to the second reinforcing member 26. In this way, structural strength of the first reinforcing member 25 and the second reinforcing member 26 is increased, thereby further improving the structural stability of the hangers 22 on the two sides of the first reinforcing member 25 and the second reinforcing member 26.

Referring to FIG. 12, in this embodiment of this application, the cable drawn out from the rotary shaft seat 30 passes through the second threading hole 251 of the first reinforcing member 25 into a bottom of the first reinforcing member 25, and then enter the antenna cavity 211 of the antenna body 21 of the antenna 20 from the bottom of the first reinforcing member 25.

Figure 13:
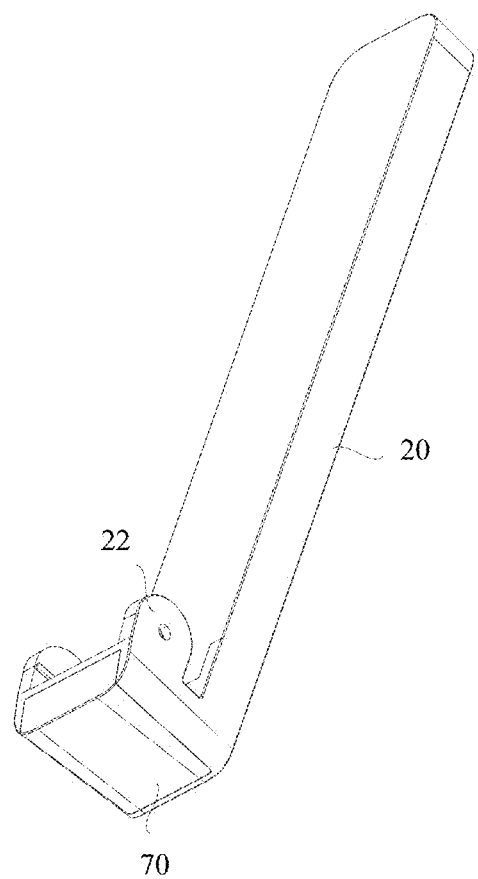
FIG. 13 is an assembled diagram of the antenna in FIG. 10 and an antenna bottom cover.
Figure 14:
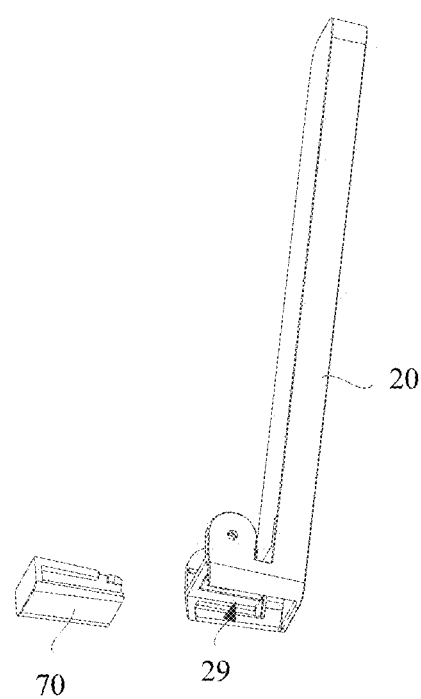
FIG. 14 is an exploded view of FIG. 13.
Figure 15:
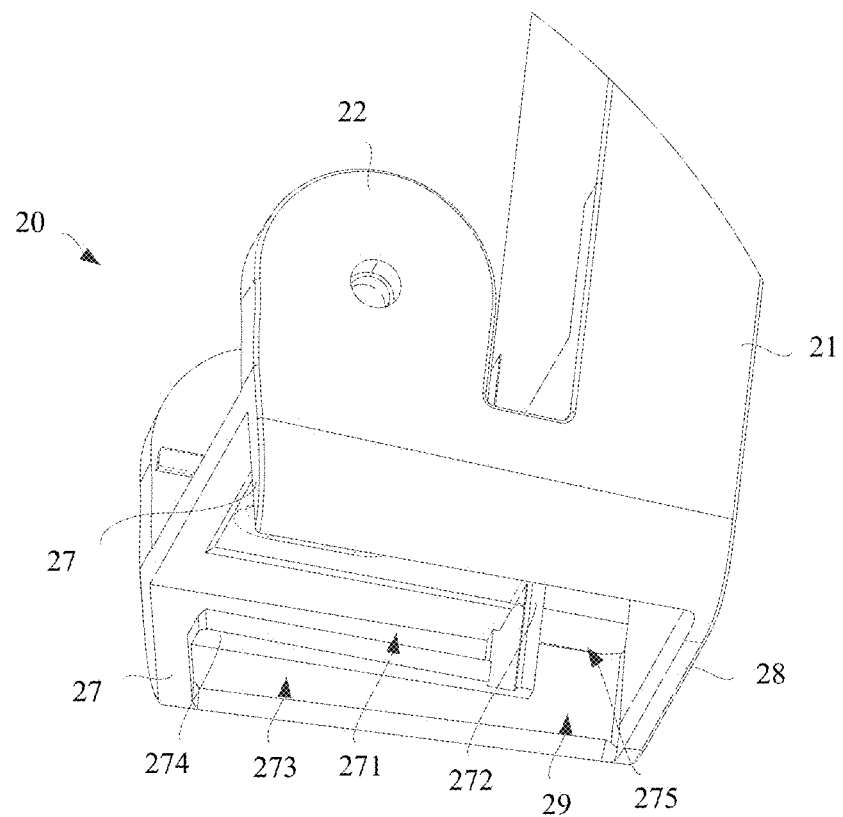
FIG. 15 is a partial schematic structural diagram of the antenna in FIG. 14.

FIG. 13 is an assembled diagram of the antenna in FIG. 10 and an antenna bottom cover. FIG. 14 is an exploded view of FIG. 13. FIG. 15 is a partial schematic structural diagram of the antenna in FIG. 14.

Referring to FIG. 15, to store and limit the cable at the bottom of the first reinforcing member 25, connecting walls 27 may extend from the bottoms of the two hangers 22 away from the hangers 22, and a blocking wall 28 may extend downward from a side wall of the antenna body 21 facing away from the hangers 22. The two connecting walls 27, the first reinforcing member 25, and the blocking wall 28 form a wiring groove 29. The second threading hole 251 is brought into communication with the antenna cavity 211 of the antenna body 21 through the wiring groove 29. In this way, the cable drawn out from the second threading hole 251 is stably stored in the wiring groove 29. In addition, a groove wall of the wiring groove 29 also shields the cable. Therefore, a user cannot observe the cable located at the bottom of the first reinforcing member 25 from the side of the router 100.

In a possible implementation, an antenna bottom cover 70 (referring to FIG. 13 and FIG. 14) may be disposed on a notch of the wiring groove 29 to seal a bottom opening of the wiring groove 29. In this way, the cable in the wiring groove 29 is shielded, and the aesthetic degree of the appearance of the router 100 is improved. In addition, dust or oil on a desktop is prevented from entering the wiring groove 29 and causing contamination or even damage to the cable. In addition, the antenna bottom cover 70 that is disposed further prevents a flexible circuit board located in the antenna cavity 211 from falling out of the wiring groove 29.

An outer end of the antenna bottom cover 70 is connected to the two connecting walls 27, the first reinforcing member 25, and the blocking wall 28. In this way, the antenna bottom cover 70 is assembled to the bottom of the antenna 20 more stably.

Figure 16:
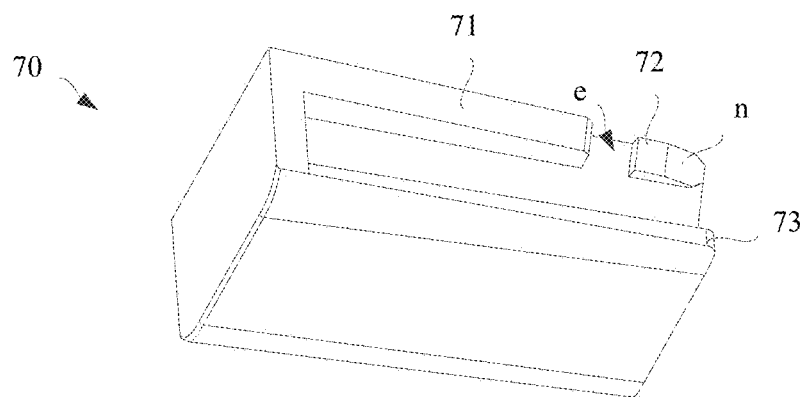
FIG. 16 is a schematic structural diagram of the antenna bottom cover in FIG. 14.

FIG. 16 is a schematic structural diagram of the antenna bottom cover in FIG. 14. Referring to FIG. 15, during specific assembly of the antenna bottom cover 70 to inner surfaces of the connecting walls 27, a first sliding groove 271 may be formed on an inner wall of each of the two connecting walls 27, and the first sliding groove 271 extends from an end of the connecting wall 27 away from the blocking wall 28 toward the blocking wall 28. Correspondingly, as shown in FIG. 16, a first sliding rail 71 matching the first sliding groove 271 is formed on a side wall of the antenna bottom cover 70. The first sliding rail 71 is stored in the first sliding groove 271. The assembly of the antenna bottom cover 70 can be completed merely by causing the first sliding rail 71 of the antenna bottom cover 70 to slide into the first sliding groove 271 from one end of the first sliding groove 271.

By means of the first sliding rail 71 and the first sliding groove 271 that are disposed, the antenna bottom cover 70 can be conveniently inserted between the two connecting walls 27, thereby improving assembly efficiency of the antenna bottom cover 70. In addition, since the first sliding rail 71 is snapped in the first sliding groove 271, the antenna bottom cover 70 is prevented from moving in an extending direction at a specific angle to the first sliding rail 71, thereby improving assembly stability of the antenna bottom cover 70 in the wiring groove 29. For example, the first sliding rail 71 is snapped in the first sliding groove 271. In this way, the antenna bottom cover 70 can be prevented from moving in a direction perpendicular to the first sliding rail 71, thereby preventing the antenna bottom cover 70 from disengaging from the bottom opening of the wiring groove 29.

To enhance the assembly stability of the antenna bottom cover 70, a width of the first sliding rail 71 may be set to be equal to a width of the first sliding groove 271. In this way, a side wall of the first sliding rail 71 can be closely attached to the groove wall of the first sliding groove 271, so that the first sliding rail 71 is more stable in the first sliding groove 271.

During specific configuration of the first sliding groove 271 in this embodiment of this application, a recess may be formed on the inner surface of the connecting wall 27. Alternatively, a protruding strip 274 may extend from the inner surface of the connecting wall 27 toward inside of the wiring groove 29, and a recess formed between the protruding strip 274 and the connecting wall 27 may be used as the first sliding groove 271. The arrangement of the first sliding groove 271 is not specifically limited in this embodiment of this application.

Figure 17:
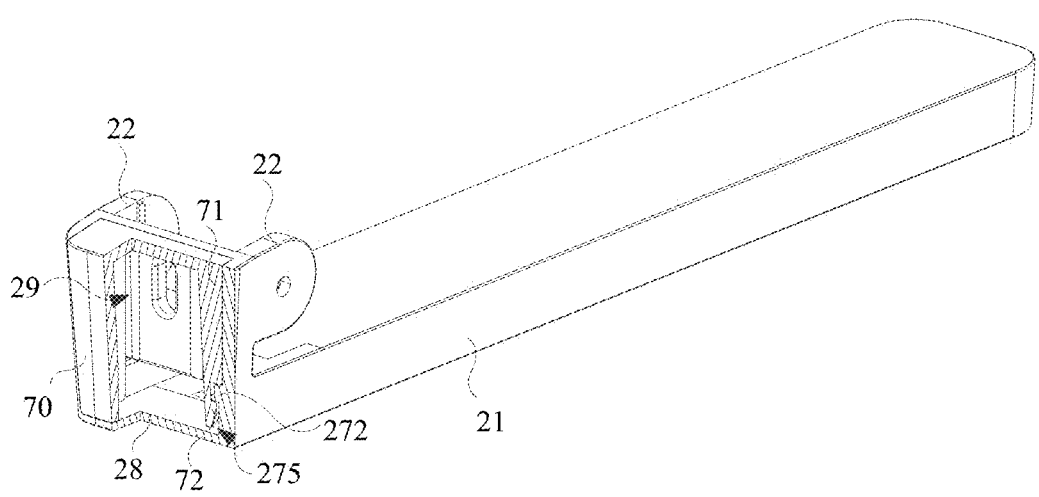
FIG. 17 is a rotated cross-sectional view of FIG. 13.

FIG. 17 is a rotated cross-sectional view of FIG. 13. Referring to FIG. 17, a slot 275 may be further formed on the inner wall of each connecting wall 27, a snap 72 matching the slot 275 is disposed on the side wall of the antenna bottom cover 70, and the snap 72 is snapped in the slot 275. By means of the arrangement, not only the stability of the antenna bottom cover 70 between the two connecting walls 27 is improved, but also the connection structure between the antenna bottom cover 70 and the connecting walls 27 is simplified, thereby improving the efficiency of assembling the antenna bottom cover 70 to the bottom of the antenna 20.

A protrusion 272 is disposed on an end of the first sliding groove 271 close to the blocking wall 28, and the slot 275 on the connecting wall 27 may be a recess formed between the protrusion 272 and the blocking wall 28. The snap 72 may be disposed in an extending direction of the first sliding rail 71, and a gap e (shown in FIG. 16) for snapping the protrusion 272 is formed between the snap 72 and the first sliding rail 71. In this way, when the antenna bottom cover 70 is slid toward the inside of the wiring groove 29, the snap 72 in the extending direction of the first sliding rail 71 spans the protrusion 272 to be snapped into the recess between the protrusion 272 and the blocking wall 28, thereby preventing the antenna bottom cover 70 from moving in the extending direction of the first sliding rail 71.

It may be understood that, when the snap 72 is snapped into the recess between the protrusion 272 and the blocking wall 28, the protrusion 272 in the connecting wall 27 is snapped into the gap e between the snap 72 and the first sliding rail 71. A width of the gap e along the extending direction of the first sliding rail 71 may be equal to a width of the protrusion 272. In this way, the antenna bottom cover 70 is further prevented from moving in the extending direction of the first sliding groove 271.

During specific configuration of the snap 72 in this embodiment of this application, the snap may be a bump extending outward from the side wall of the antenna bottom cover 70. The bump may be integrally formed with the antenna bottom cover 70.

In addition, at least part of a surface of an end of the snap 72 away from the first sliding rail 71 may be configured as an inclined surface n (referring to FIG. 16). The inclined surface n faces an end away from the first sliding rail 71. For example, a side of the bump disposed on the antenna bottom cover 70 away from the first sliding rail 71 forms the inclined surface n. A lower end of the inclined surface n is away from the first sliding rail 71, and an upper end of the inclined surface n is close to the first sliding rail 71. In this way, the bump can conveniently span the protrusion 272 on one end of the first sliding groove 271 to be snapped into the recess between the protrusion 272 and the blocking wall 28, thereby improving efficiency of assembling the antenna bottom cover 70 and the antenna 20.

It should be noted that, a distance between a top surface of the lower end of the inclined surface n and a side surface of the antenna bottom cover 50 is less than a distance between a top surface of a high end of the inclined surface n and the side surface of the antenna bottom cover 50.

In a possible implementation, a second sliding groove 273 (referring to FIG. 15) may be further formed on the inner walls of each of the two connecting walls 27. The second sliding groove 273 extends from the end of the connecting wall 27 away from the blocking wall 28 to the blocking wall 28.

The second sliding groove 273 is spaced apart from the first sliding groove 271. For example, the first sliding groove 271 is disposed close to the first reinforcing member 25, and the second sliding groove 273 is disposed away from the first reinforcing member 25. A second sliding rail 73 matching the second sliding groove 273 is formed on the side wall of the antenna bottom cover 70, and the second sliding rail 73 is embedded in the second sliding groove 273, so as to further improve the efficiency of assembling the antenna bottom cover 70 and the antenna 20, and ensure stability of the antenna bottom cover 70 in an extending direction perpendicular to the second sliding rail 73.

The second sliding rail 73 is configured as an outer edge portion extending from the bottom of the antenna bottom cover 70. Therefore, a groove wall of the second sliding groove 273 close to the bottom end of the connecting wall effectively blocks the outer edge portion, thereby protecting the outer edge portion. In this way, the outer edge portion of the antenna bottom cover 70 is effectively prevented from being knocked by an external object.

In addition to the above connection manners, the antenna bottom cover 70 in this embodiment of this application may alternatively be fixed in the wiring groove 29 by means of bonding or screw connection. The manners of connection between the antenna bottom cover 70 and the connecting wall 27 as well as the blocking wall 28 are not specifically limited in this embodiment of this application.

A first limiting portion 32 and a second limiting portion 33 (referring to FIG. 5) are disposed on a side of the rotary shaft seat 30 in this embodiment of this application facing the hangers 22. For example, in this embodiment of this application, the first limiting portion 32 and the second limiting portion 33 are disposed on each two opposite end surfaces of the rotary shaft seat 30.

The first limiting portion 32 is configured to prevent the antenna 20 at a used position from rotating around the shaft pin 40, so that the antenna 20 does not shake in the used state, thereby ensuring that a signal transmitted by the antenna 20 is more stable. In addition, the first limiting portion 32 that is disposed can further fix the antenna 20 during the rotation of the antenna. That is to say, as long as the hangers 22 of the antenna 20 are rotated to the first limiting portions 32, the antenna 20 can be ensured to be at the used position, so that positioning of the antenna 20 at the used position is more rapid and accurate.

The second limiting portion 33 is configured to prevent the antenna 20 at a stored position from rotating around the shaft pin 40, so that the antenna 20 can be stably stored on the upper surface a of the housing 10 without shaking. In addition, the second limiting portion 33 that is disposed further fixes the antenna 20 that is stored. That is to say, the antenna 20 can be stored merely by rotating the hangers 22 of the antenna 20 to the second limiting portion 33. Therefore, accurate and efficient fixing of the antenna 20 at the stored position is achieved.

During specific implementation, the first limiting portion 32 may include a first groove formed on the rotary shaft seat 30, and the second limiting portion 33 includes a second groove formed on the rotary shaft seat 30. The first groove and the second groove both extend along a radial direction of the rotary shaft seat 30. A preset included angle exists between the first groove and the second groove. A protruding portion 222 is formed on a side of each of the two hangers 22 facing the rotary shaft seat 30. The protruding portion 222 extends into the first groove when the antenna 20 is at the used position, and the protruding portion 222 extends into the second groove when the antenna 20 is at the stored position.

For example, when the antenna 20 is required to be stored, the antenna 20 starts to be rotated, so that the protruding portion 222 on the inner surface of the hanger 22 is first disengaged from the first groove, and then the movable end of the antenna 20 is continuously rotated toward the upper surface a of the housing 10 until the antenna 20 encounters a stop. That is to say, the protruding portion 222 is snapped into the second groove on the rotary shaft seat 30. In this way, storing of the antenna 20 is completed. When the antenna 20 is required to be used, the movable end of the antenna 20 starts to be rotated away from the housing 10, so that the protruding portion 222 on the hanger 22 is disengaged from the second groove, and then the antenna 20 is further rotated until the antenna 20 encounters a stop. That is to say, the protruding portion 222 is snapped into the first groove, and the rotation of the antenna 20 is stopped. At this time, the antenna 20 is at the used position.

A specific value of the preset included angle between the first groove and the second groove may be adjusted according to an actual requirement for the stored position and the used position of the antenna 20. For example, the preset included angle between the first groove and the second groove may be a right angle. Therefore, the antenna 20 can reach the used position merely by means of rotation by 90° from the stored position.

In this embodiment of this application, the first limiting portion 32 and the second limiting portion 33 are configured as groove structures, and the protruding portions 222 (referring to FIG. 8) matching the grooves are respectively disposed on the inner walls of the hangers 22. In this way, the antenna 20 in the used state or the stored state is stabilized, and the structures of the first limiting portion 32 and the second limiting portion 33 are simplified, thereby improving manufacturing and assembly efficiency of the router 100 in this embodiment of this application.

Two ends of each of the first groove and the second groove respectively extend to an outer edge of the rotary shaft seat 30, and two ends of the protruding portion 222 extend to an outer edge of the hanger 22. In this way, contact areas between the protruding portions 222 of the hangers 22 and the grooves on the rotary shaft seat 30 are increased, so that the hangers 22 can be stabilized in an entire radial direction, thereby improving the stability of the antenna 20 in the used state and the stored state.

In the description of the embodiments of this application, it should be noted that, unless otherwise explicitly specified and defined, the terms "mount", "connect", and "connection" should be understood in a broadest sense, for example, fixed connection, indirect connection by a medium, or internal communication between two elements or an interaction relationship between the two elements. A person of ordinary skill in the art may understand the specific meanings of the foregoing terms in the embodiments of this application according to specific situations.

The terms such as "first", "second", "third", and "fourth" (if any) in the specification and claims of the embodiments of this application and in the accompanying drawings are used for distinguishing between similar objects and not necessarily used for describing any particular order or sequence.

What is claimed is:

1. A router, characterized by comprising a housing, at least one rotary shaft seat, and at least one antenna, wherein
the rotary shaft seat is disposed on one end of the housing, a shaft pin is inserted through the rotary shaft seat, one end of the antenna is movably sleeved on the shaft pin, and an other end of the antenna is located on a side of a front of the housing; and
a shielding portion extends from an end of the housing where the rotary shaft seat is disposed, the shielding portion and the housing are integrally formed as a whole, the rotary shaft seat is located on a side of the shielding portion facing a back of the housing, and an end of the shielding portion away from the housing extends to at least a side of the rotary shaft seat away from the housing.

2. The router according to claim 1, characterized by further comprising two ribs disposed opposite to each other, wherein the two ribs respectively extend from two ends of the shielding portion toward a side where the rotary shaft seat is disposed; and
the ribs shield at least the shaft pin on two sides of the rotary shaft seat.

3. The router according to claim 1, characterized in that a plurality of antennas are disposed, the plurality of antennas are spaced apart from each other in a first extending direction of the housing, and each of the antennas is connected to the housing by using the corresponding rotary shaft seat.

4. The router according to claim 3, characterized in that the antenna comprises an antenna body and two hangers bent from one end of the antenna body toward the rotary shaft seat, wherein the two hangers are respectively sleeved on the shaft pin on the two ends of the rotary shaft seat; and
an avoidance opening is formed between the hangers and the antenna body, wherein the avoidance opening is configured for the antenna body to avoid the shielding portion in a case that the antenna body rotates toward a surface of the housing.

5. The router according to claim 4, characterized in that the antenna further comprises a transition portion connected between the hangers and the antenna body; and
the hangers and the antenna body are located on a same side of the transition portion, and the hangers, the transition portion, and an inner wall of the antenna body form the avoidance opening, and distances between the hangers and the antenna body are greater than or equal to a thickness of the shielding portion.

6. The router according to claim 5, characterized in that the antenna further comprises a first reinforcing member;
two ends of the first reinforcing member are respectively connected to inner surfaces of the two hangers;
a first threading hole is formed on the rotary shaft seat, and a second threading hole is formed on the first reinforcing member, wherein the second threading hole is in communication with the first threading hole and an antenna cavity of the antenna body;
the antenna further comprises a second reinforcing member; and
two ends of the second reinforcing member are respectively connected to sides of the two hangers close to the antenna body, and an end of the first reinforcing member close to the antenna body is connected to the second reinforcing member.

7. The router according to claim 6, characterized by further comprising an antenna bottom cover, wherein
a connecting wall extends from a bottom of each of the two hangers away from the hanger, and a blocking wall extends downward from a side wall of the antenna body facing away from the hangers; and
the two connecting walls, the first reinforcing member, and the blocking wall form a wiring groove, wherein the second threading hole is brought into communication with the antenna cavity of the antenna body through the wiring groove, and the antenna bottom cover is disposed at an opening of the wiring groove.

8. The router according to claim 7, characterized in that a first sliding groove is formed on an inner wall of each of the two connecting walls, wherein the first sliding groove extends from an end of the connecting wall away from the blocking wall toward the blocking wall; and
   a first sliding rail matching the first sliding groove is formed on a side wall of the antenna bottom cover, wherein the first sliding rail is stored in the first sliding groove.

9. The router according to claim 8, characterized in that a slot is further formed on the inner wall of each connecting wall, wherein a snap matching the slot is disposed on the side wall of the antenna bottom cover, and the snap is snapped in the slot;
   a protrusion is disposed on an end of the first sliding groove close to the blocking wall, wherein the slot is a recess formed between the protrusion and the blocking wall; the snap is disposed in an extending direction of the first sliding rail, and a gap configured for the protrusion to be snapped in is formed between the snap and the first sliding rail; and
   a width of the gap along the extending direction of the first sliding rail is equal to a width of the protrusion.

10. The router according to claim 9, characterized in that at least part of a surface of an end of the snap away from the first sliding rail is configured as an inclined surface, wherein the inclined surface faces the end away from the first sliding rail.

11. The router according to claim 10, characterized in that a second sliding groove is further formed on the inner wall of each of the two connecting walls, wherein the second sliding groove extends from the end of the connecting wall away from the blocking wall to the blocking wall;
   the second sliding groove is spaced apart from the first sliding groove, a second sliding rail matching the second sliding groove is formed on the side wall of the antenna bottom cover, and the second sliding rail is embedded in the second sliding groove; and
   the second sliding rail is configured as an outer edge portion extending outward from a bottom of the antenna bottom cover.

12. The router according to claim 11, characterized in that a first limiting portion and a second limiting portion are disposed on a side of the rotary shaft seat facing the hangers;
   the first limiting portion is configured to prevent the antenna at a used position from rotating around the shaft pin, and the second limiting portion is configured to prevent the antenna at a stored position from rotating around the shaft pin;
   the first limiting portion comprises a first groove formed on the rotary shaft seat, the second limiting portion comprises a second groove formed on the rotary shaft seat, the first groove and the second groove both extend in a radial direction of the rotary shaft seat, and a preset included angle exists between the first groove and the second groove;
   a protruding portion is formed on a side of each of the two hangers facing the rotary shaft seat, wherein the protruding portion extends into the first groove in a case that the antenna is at the used position, and the protruding portion extends into the second groove in a case that the antenna is at the stored position;
   two ends of each of the first groove and the second groove respectively extend to an outer edge of the rotary shaft seat; and
   two ends of the protruding portion extend to an outer edge of the hanger.

13. The router according to claim 12, characterized in that the housing comprises a lower cover and an upper cover disposed on the lower cover; and
   the upper cover and the lower cover form an accommodating cavity of the housing, and the shielding portion is disposed on the upper cover.

* * * * *